(12) United States Patent
McIntyre et al.

(10) Patent No.: US 6,421,082 B1
(45) Date of Patent: Jul. 16, 2002

(54) FORMING IMAGES ON RECEIVERS HAVING FIELD-DRIVEN PARTICLES

(75) Inventors: Dale F. McIntyre, Honeoye Falls; Steven D. MacLean, Webster; Xin Wen, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/067,627

(22) Filed: Apr. 28, 1998

(51) Int. Cl.⁷ .............................................. H04N 5/225
(52) U.S. Cl. ................... 348/207; 348/333.01; 348/273
(58) Field of Search ............... 348/207, 333.01–333.12, 348/333, 374, 375, 376; 345/107; H04N 5/225

(56) References Cited

U.S. PATENT DOCUMENTS

| | | | |
|---|---|---|---|
| 3,612,758 A | | 10/1971 | Evans et al. |
| 4,143,103 A | | 3/1979 | Sheridon |
| 5,032,911 A | | 7/1991 | Takimoto |
| 5,344,594 A | | 9/1994 | Sheridon |
| 5,604,027 A | | 2/1997 | Sheridon |
| 5,790,193 A | * | 8/1998 | Ohmori ...................... 348/375 |
| 6,118,419 A | * | 9/2000 | Smith et al. .................. 345/84 |
| 6,124,851 A | * | 9/2000 | Jacobson .................... 345/206 |
| 6,323,989 B1 | * | 11/2001 | Jacobson et al. ........... 359/296 |

FOREIGN PATENT DOCUMENTS

WO 97/04398 7/1996

OTHER PUBLICATIONS

"A Newly Developed Electrical Twisting Ball Display" by Saitoh et al p249–253, Proceedings of the SID, vol. 23/4, 1982.

* cited by examiner

*Primary Examiner*—Tuan Ho
(74) *Attorney, Agent, or Firm*—Raymond L. Owens; Stephen H. Shaw

(57) ABSTRACT

An insertable cartridge for insertion into a receiving structure having electronic addressing circuitry for forming a visual image of a stored image is disclosed. The cartridge includes a housing for receiving a plurality of receivers, each receiver including field-driven particles in a matrix that can change reflective density in response to an applied electric field which intersect at positions corresponding to pixels and the housing defining alignment features for insertion into the receiving structure which receives and positions an inserted cartridge. The housing further includes electronic interconnecting circuitry for connection between the addressing circuitry and a receiver after a cartridge has been inserted in the receiving structure for permitting the application of voltages at the pixel positions across the field-driven particles at particular locations in the receiver corresponding to pixels in the stored image to produce an image in the receiver in the cartridge.

5 Claims, 4 Drawing Sheets

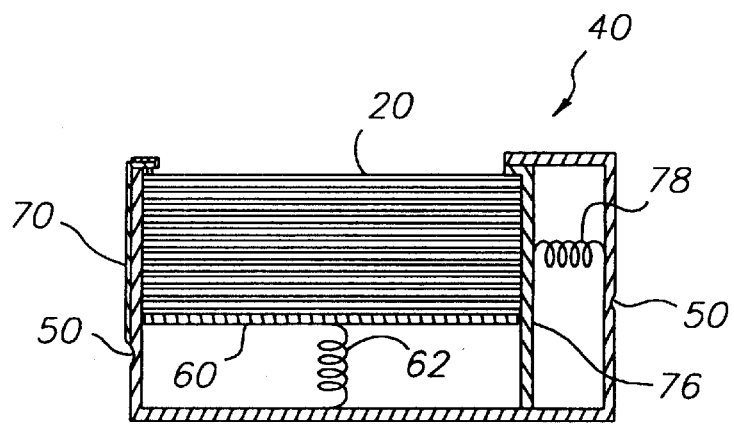
FIG. 5a
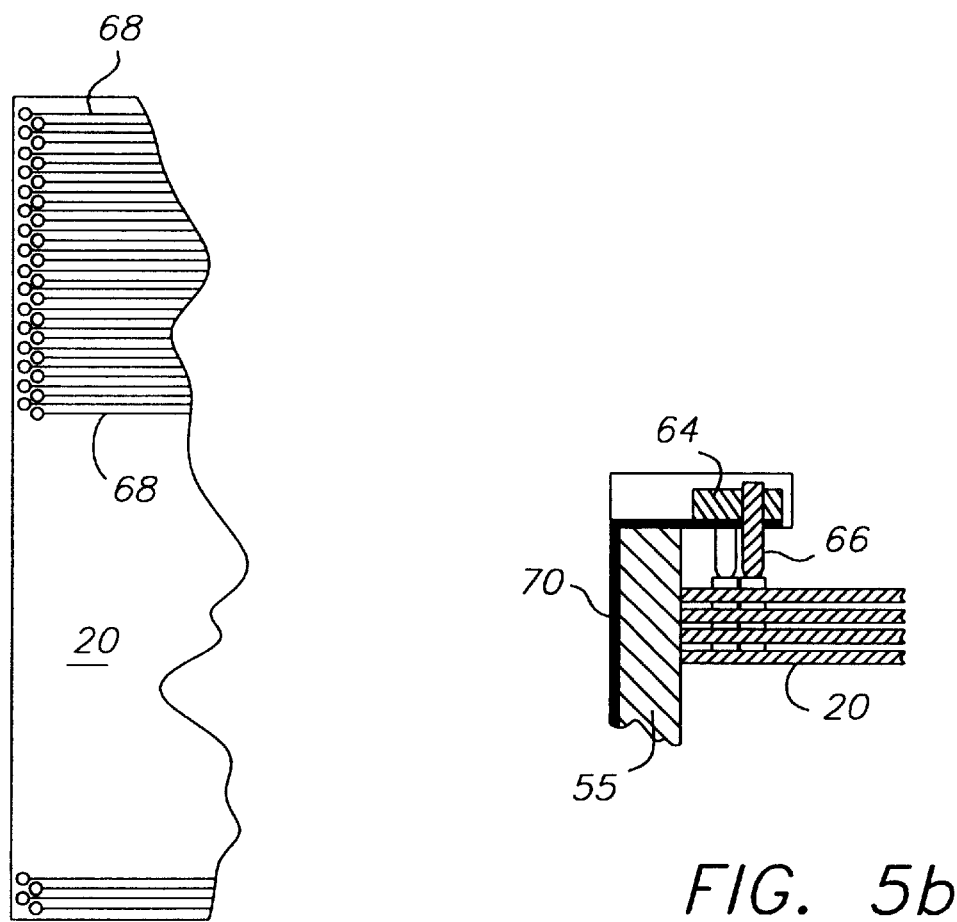
FIG. 4
FIG. 5b

FORMING IMAGES ON RECEIVERS HAVING FIELD-DRIVEN PARTICLES

CROSS REFERENCE TO RELATED APPLICATIONS

Reference is made to commonly assigned U.S. patent application Ser. No. 09/035,606 filed Mar. 5, 1998, entitled "Forming Images on Receivers Having Field-Driven Particles" and U.S. patent application Ser. No. 09/012,842 filed Jan. 23, 1998, entitled "Addressing Non-Emissive Color Display Device". The disclosure of these related applications is incorporated herein by reference.

FIELD OF THE INVENTION

The present invention relates to an insertable cartridge having receivers with field-driven particles.

BACKGROUND OF THE INVENTION

There are several types of electric field-driven particles in the field of non-emissive displays. One class is the so-called electrophoretic particle that is based on the principle of movement of charged particles in an electric field. In an electrophoretic receiver, the charged particles containing different reflective optical densities can be moved by an electric field to or away from the viewing side of the receiver, which produces a contrast in the optical density. Another class of electric field-driven particles are particles carrying an electric dipole. Each pole of the particle is associated with a different optical densities (bi-chromatic). The electric dipole can be aligned by a pair of electrodes in two directions, which orient each of the two polar surfaces to the viewing direction. The different optical densities on the two halves of the particles thus produces a contrast in the optical densities.

To produce a high quality image it is essential to form a plurality of image pixels by varying the electric field on a pixel wise basis. The electric fields can be produced by a plurality pairs of electrodes embodied in the receiver as disclosed in U.S. Pat. No. 3,612,758.

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card or in dedicated memory within the camera.

A shortcoming with prior electronic cameras is that data must be transmitted from the electronic camera to printer. Interfaces must be present to transfer the data. As disclosed in U.S. Pat. No. No. 5,032,911, printers that write to light sensitive media print must have means within the printer that operate on received data and convert the data into modulated light to mark the photosensitive sheet. Many newer electronic cameras incorporate light emitting displays to view a captured image. However, the apparatus for producing such images is not available for light writing onto photosensitive media.

SUMMARY OF THE INVENTION

It is an object of the present invention to provide an insertable cartridge for having receivers with field-driven particles which can be used in a receiving structure for printing images on such receivers.

This object is achieved by an insertable cartridge for insertion into a receiving structure having electronic addressing means for forming a visual image of a stored image comprising:

a) a housing for receiving a plurality of receivers, each receiver including field-driven particles in a matrix that can change reflective density in response to an applied electric field which intersect at positions corresponding to pixels;

b) the housing defining alignment features for insertion into the receiving structure which receives and positions an inserted cartridge; and c) the housing including electronic interconnecting means for connection between the addressing means and a receiver after a cartridge has been inserted in the receiving structure for permitting the application of voltages at the pixel positions across the field-driven particles at particular locations in the receiver corresponding to pixels in the stored image to produce an image in the receiver in the cartridge.

ADVANTAGES

A feature of this invention is that an insertable cartridge having a plurality of receivers with field-driven particles and that images can be formed in the cartridge on the top receiver.

Another feature of the invention is that the cartridge housing can be provided with electrical interconnection which, when the cartridge is inserted into a receiving structure such as a printer or a camera, are interconnected with addressing means for addressing pixel positions on the top receiver.

BRIEF DESCRIPTION OF THE DRAWINGS

FIG. 4 shows a partial top view of the offset circular tracks 50 of FIG. 1 and the layout of the electrodes of offset circular tracks 50;

FIG. 5a is a cross sectional similar to that shown in FIG. 7, but only of the cartridge;

FIG. 5b is an detailed partial enlargement of the cross sectional view of FIG. 5a showing the receiver electrodes in contact with the electronic interconnection assembly

DETAILED DESCRIPTION OF THE INVENTION

The invention is directed to an insertable cartridge 40 which is inserted into a receiving structure for forming images. The receiving structure can be a compact printer or an electronic camera 10. In any case, images are formed on the top receiver 20. The present invention will be described in connection with electronic camera 10 although other printer arrangements will suggest themselves to those skilled in the art. Such electronic cameras often have a flat panel color display that is used to frame and/or review capture images. Separable printers exist that receive data from said electronic cameras. Typically, interface electronics is disposed in each device and data is transmitted from the electronic camera to the printer.

Figure 1:
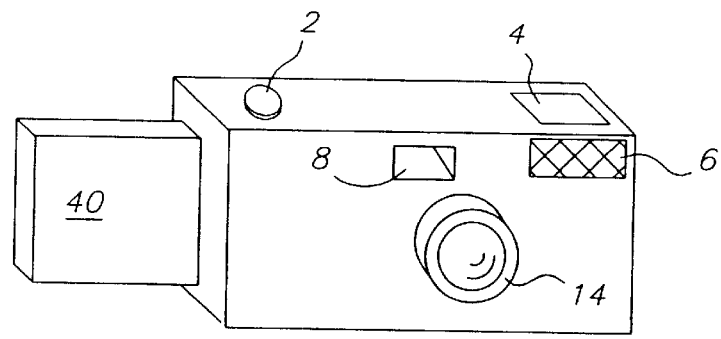
FIG. 1 is a front perspective of an electronic camera which can receive an insertable cartridge in accordance with the present invention.

Turning now to FIG. 1, an electronic camera 10 is shown. It is of conventional design and includes shutter button 2, control information display 4, electronic flash assembly 6, optical viewfinder 8, and lens system 14. Highly unconventional is the ability of the camera to accept the insertable cartridge 40 for forming hardcopy images on its enclosed receiver sheets.

Figure 2A:
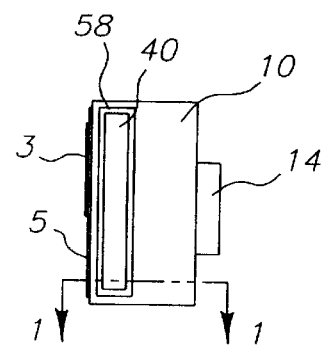
FIG. 2a is a left side view of the electronic camera of FIG. 1 showing the insertable cartridge slot with a cartridge positioned in such slot.
Figure 2B:
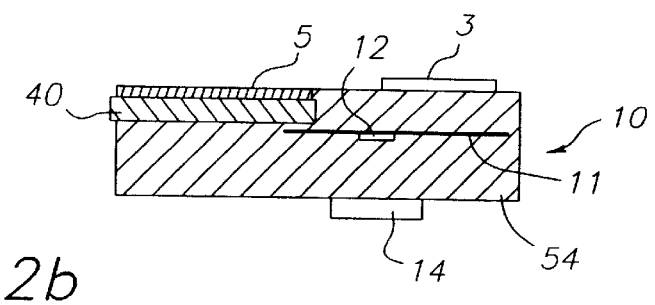
FIG. 2b is a top sectional view taken along the lines 1—1 of the electronic camera of FIG. 1.
Figure 3:
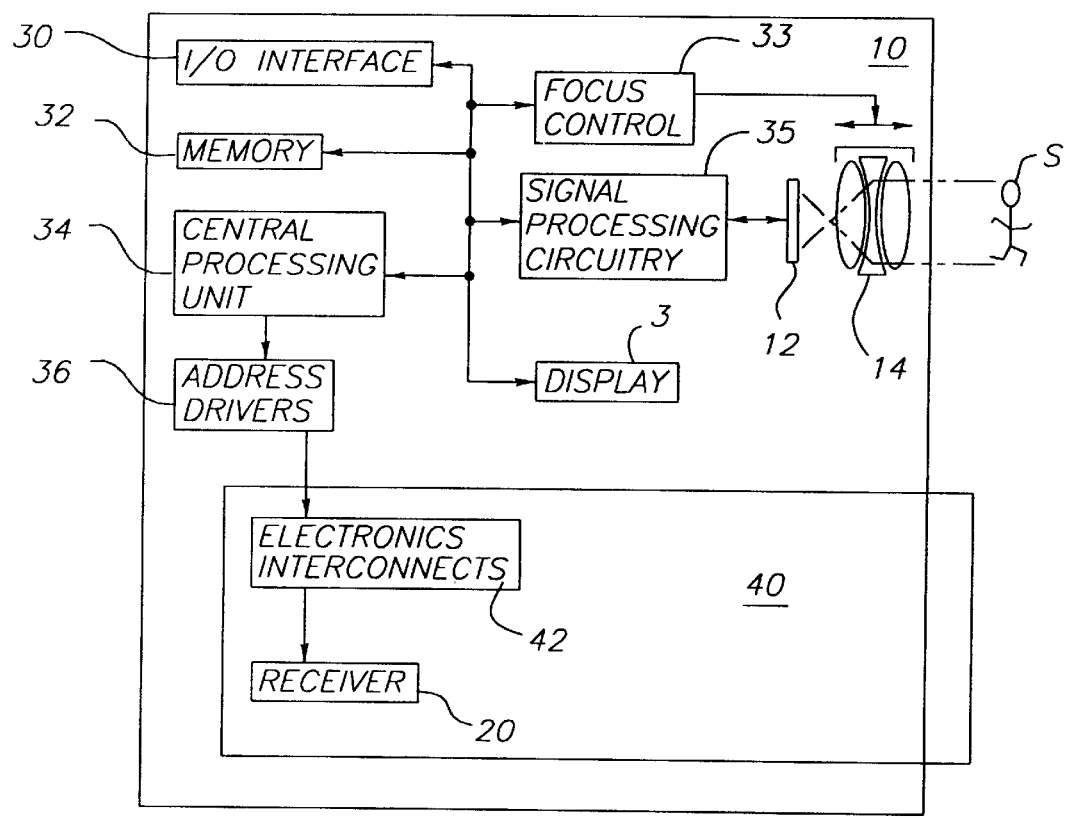
FIG. 3 is an electrical block diagram of circuitry in the camera for addressing interconnecting circuitry in the cartridge for forming an image on the top receiver in the cartridge.

Turning now to FIG. 2a and FIG. 3, an electronic display 3 is mounted on the rear surface of the camera 10 for displaying an image before a hardcopy print on the top receiver 20 of a stack of receivers is made. An access door 5 can be removed so that a print can be taken from the camera 10. The camera 10 is also shown to include a camera circuit board 11 and an area image sensor 12 shown more fully in FIG. 3. The camera also includes a lens system 14. As shown, the insertable cartridge 40 has been inserted into a slot formed in a camera housing 54 which will be described more fully hereinafter.

Turning now to FIG. 3, where the electronic camera 10 is shown in block diagram form. The electronic camera 10 can be of a conventional design and can capture either still images or temporally spaced sequences of still images. Images are captured by the area image sensor 12 after an image of subject S has been focused by the lens system 14 onto such area image sensor 12. The electronic camera 10 can include the electronic display 3 for showing an image prior to its being produced on the top receiver 20 so that a user can decide whether or not it is appropriate to make a hardcopy image. Electronic display 3 can be, for instance, a LCD or organic polymer display system of conventional design.

Figure 6:
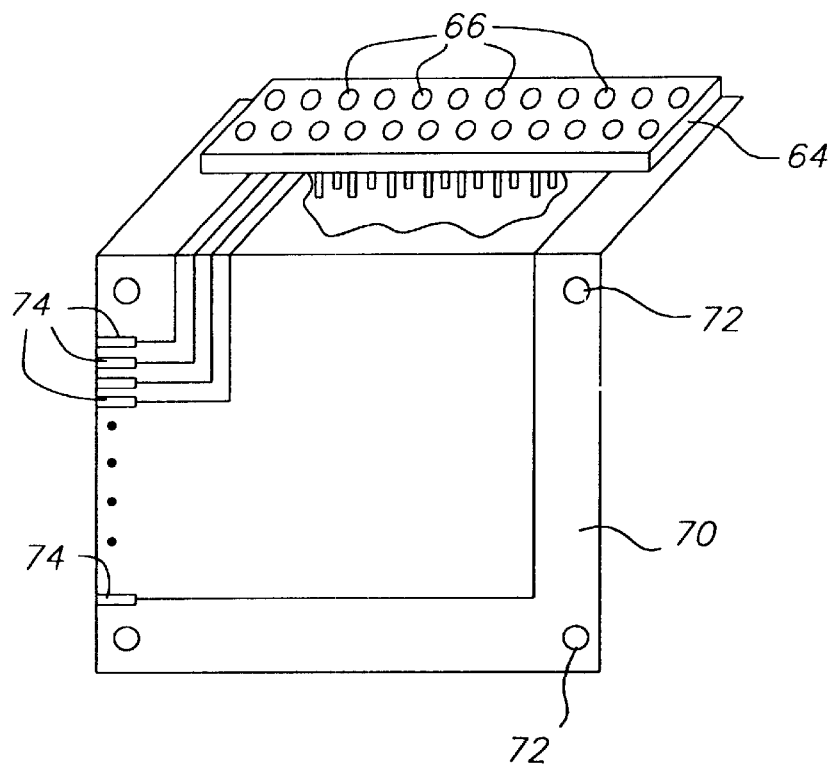
FIG. 6 is a perspective of a flex circuit forming the electronic interconnect with a cutaway view of the pins which contact the offset circular tracks 50.
Figure 7:
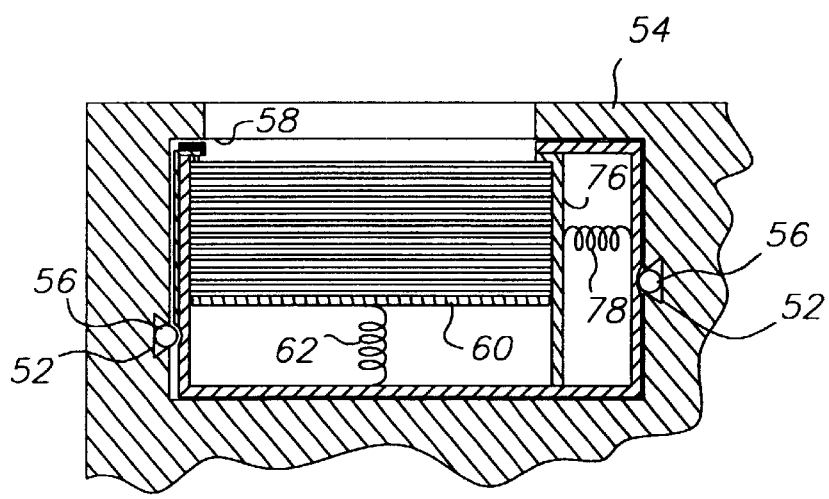
FIG. 7 is a cross sectional view of the insertable cartridge while inserted in a receiving body showing the effect of the alignment features of the insertable cartridge.

Electronic camera 10, in accordance with the present invention, includes features for receiving the insertable cartridge 40. These features are shown in FIG. 7 and include two triangular tracks 52 formed in the camera housing 54. Ball bearings 56 are disposed in the triangular tracks 52 allowing the insertable cartridge 40 to be slideably inserted into a slot 58 formed in the camera housing 54. Offset circular tracks 50 disposed on either side of the insertable cartridge 40 permit the insertion into slot 58 of electronic camera 10. Insertable cartridge 40 further includes a vertical pressure plate 60 which is urged by a spring 62 so as to cause the receivers positioned on the pressure plate 60 to be moved so that the top most top receiver 20 will be in a image transfer relationship with an electrode header 64 which is shown in FIG. 6. A lateral pressure plate 76 is urged by a spring 78 against the sides of the receivers in a stack on the pressure plate 60 to properly laterally position the receivers.

As shown in FIG. 5b, the electrode header 64 includes a plurality of electrodes 66 which engage traces 68 formed on the top most receiver to provide electrical connection for the application of voltages which will be described more fully in FIG. 3. Although only lateral traces are shown across the top receiver 20, it will be understood that other traces intersect with the lateral traces at positions corresponding to pixels where an electric field is to be applied. When addressed, the electrodes connect the appropriate traces to cause an electric field to be applied at the pixel position in the top receiver 20.

The electrode header 64 is secured to a flexible circuit 70 which is in turn secured by means of pins 72 to the side wall of the cartridge housing 55 as shown in FIG. 5a and FIG. 7. The flexible circuit 70 includes a number of leads 74 which provide electronic interconnects 42 shown in FIG. 3. Electronic interconnects 42 together with electrode header 64 and electrodes 66 connect address drivers 36 (FIG. 3) to traces 68 on top receiver 20 for forming a hardcopy print.

The top receiver 20 includes field driven particles disposed in a matrix. These field driven particles can be conventional. The field-driven particles can include many different types, for example, the bi-chromatic dipolar particles and electrophoretic particles. In this regard, the following disclosures are herein incorporated in the present invention. Details of the fabrication of the bi-chromatic dipolar particles and their addressing configuration are disclosed in U.S. Pat. Nos. 4,143,103; 5,344,594; and 5,604,027, and in "A Newly Developed Electrical Twisting Ball Display" by Saitoh et al p249–253, Proceedings of the SID, Vol. 23/4, 1982, the disclosure of these references are incorporated herein by reference. Another type of field-driven particle is disclosed in PCT Patent Application WO 97/04398. It is understood that the present invention is compatible with many other types of field-driven particles that can display different color densities under the influence of an applied electrical field.

Returning to FIG. 3, an image of the subject, S, is focused by lens system 14. A conventional focus control 33 can automatically adjust the lens system 14 to focus an image of the subject S on the area image sensor 12. Conventional signal processing circuitry 35 receives signals from the area image sensor 12 and applies its signal under the control of central processing unit 34. The central processing unit 34 controls the operation of various functions for example the I/O interface 30, reading and writing from memory 32, the signal processing circuitry 35, the display 3 and address drivers 36. The I/O interface 30 will be understood to include circuitry necessary for connection to external devices such as delivery of a digital image to another computer or input from a camera user. All these circuits are conventional and need not be described in detail here.

The central processing unit 34 in response to digital images stored in memory 32 provides control signals to address drivers 36. The address drivers 36 provide control voltages to appropriate leads 74 (see FIG. 6) which form the electronic interconnections with electrodes 66 as discussed earlier. The electronic interconnects 42 are schematically shown to be within the cartridge 40. As shown in FIG. 5b, electrodes 66 provide applied voltages to appropriate traces on top receiver 20.

The invention has been described in detail with particular reference to certain preferred embodiments thereof, but it will be understood that variations and modifications can be effected within the spirit and scope of the invention.

PARTS LIST 2 shutter button
3 electronic display
4 control information display
5 access door
6 electronic flash assembly
8 optical viewfinder
10 electronic camera
11 camera circuit board 12 area image sensor
14 lens system
20 top receiver
30 I/O interface
32 memory
33 focus control
34 central processing unit
35 signal processing circuitry
36 address drivers
40 insertable cartridge
42 electronic interconnects
50 offset circular tracks
52 triangular tracks
54 camera housing
55 cartridge housing
56 ball bearings
58 slot
60 vertical pressure plate
62 spring
64 electrode header
66 electrodes
68 traces
70 flexible circuit
72 pins
74 leads
76 lateral pressure plate
78 spring

What is claimed is:

1. An insertable cartridge for insertion into a receiving structure having electronic addressing means for forming a visual image of a stored image comprising:

a) a housing for receiving a plurality of receivers, each receiver including field-driven particles in a matrix that can change reflective density in response to an applied electric field at positions corresponding to pixels;

b) the housing defining alignment features for insertion into the receiving structure which receives and positions an inserted cartridge; and c) the housing including electronic interconnecting means for connection between the addressing means and a receiver after a cartridge has been inserted in the receiving structure for permitting application of voltages at the pixel positions across the field-driven particles at particular locations in the receiver corresponding to pixels in the stored image to produce an image in the receiver in the cartridge.

2. An insertable cartridge for insertion into a receiving structure having electronic addressing means for forming a visual image of a stored image comprising:

a) a housing for receiving a plurality of receivers, each receiver including field-driven particles in a matrix that can change reflective density in response to an applied electric field and having traces which intersect at positions corresponding to pixels, b) the housing defining alignment features for insertion into the receiving structure which receives and positions an inserted cartridge; and c) the housing including electronic interconnecting means for connection between the addressing means and the traces in a receiver after a cartridge has been inserted in the receiving structure for permitting application of voltages at the pixel positions across the field-driven particles at particular locations in the receiver corresponding to pixels in the stored image to produce an image in the receiver in the cartridge.

3. An electronic camera for forming images on a receiver, comprising:

a) means for focusing an image of a subject at an image plane, b) area image sensor means disposed at the image plane for receiving the image subject and producing a digital image having a plurality of pixels that represent the subject;

c) storage means coupled to the area image sensor for storing the digitized image of the subject; and d) a display for displaying an image corresponding to the stored image;

e) electronic addressing means for addressing pixels on a receiver;

f) an insertable cartridge having:

i) a housing for receiving a plurality of receivers, each receiver including field-driven particles in a matrix that can change reflective density in response to an applied electric field which intersect at positions corresponding to pixels;

ii) the housing defining alignment features for insertion into the receiving structure which receives and positions an inserted cartridge; and iii) the housing including electronic interconnecting means for connection between the addressing means and a receiver after a cartridge has been inserted in the receiving structure for permitting application of voltages at the pixel positions across the field-driven particles at particular locations in the receiver corresponding to pixels in the stored image to produce an image in the receiver in the cartridge.

4. The electronic camera of claim 3 wherein the field-driven particles are solid phase particles in a matrix.

5. The electronic camera of claim 3 wherein the receiver includes traces and wherein the cartridge includes means for electrically connecting the traces to potential for applying the voltages at the pixel positions.

* * * * *